(12) United States Patent
Zschintzsch

(10) Patent No.: US 6,999,787 B2
(45) Date of Patent: Feb. 14, 2006

(54) METHOD FOR SYNCHRONIZING THE INTERNAL CLOCK OF A MOBILE RADIO TERMINAL WITH LOCAL TIME

(75) Inventor: Hans Zschintzsch, Konigswinter (DE)

(73) Assignee: T-Mobile Deutschland GmbH, Bonn (DE)

( * ) Notice: Subject to any disclaimer, the term of this patent is extended or adjusted under 35 U.S.C. 154(b) by 195 days.

(21) Appl. No.: 10/344,206

(22) PCT Filed: Aug. 9, 2001

(86) PCT No.: PCT/DE01/02954

§ 371 (c)(1),
(2), (4) Date: Jun. 10, 2003

(87) PCT Pub. No.: WO02/14961

PCT Pub. Date: Feb. 21, 2002

(65) Prior Publication Data

US 2004/0023681 A1 Feb. 5, 2004

(51) Int. Cl.
*H04B 7/15* (2006.01)
(52) U.S. Cl. ............. 455/550.1; 455/418; 455/423; 455/425; 455/67.11; 455/566
(58) Field of Classification Search ............ 455/11.1, 455/67.11, 418, 423, 425, 466, 550.1, 566
See application file for complete search history.

(56) References Cited

U.S. PATENT DOCUMENTS

| | | | |
|---|---|---|---|
| 6,563,765 B1 * | 5/2003 | Ishigaki | 368/47 |
| 6,587,398 B1 * | 7/2003 | Mock et al. | 368/21 |
| 6,728,533 B1 * | 4/2004 | Ishii | 455/425 |
| 2004/0072595 A1 * | 4/2004 | Anson et al. | 455/566 |

FOREIGN PATENT DOCUMENTS

| | | |
|---|---|---|
| DE | 198 60 939 A1 | 12/1998 |
| DE | 100 65 484 A1 | 12/2000 |
| FR | 2 784 760 | 10/1998 |
| GB | 2 346 768 A | 12/1999 |
| GB | 2 362 787 A | 12/2000 |

* cited by examiner

*Primary Examiner*—William Trost
*Assistant Examiner*—James D Ewart
(74) *Attorney, Agent, or Firm*—Myron Greenspan, Esq.; Lackenbach Siegel, LLP

(57) ABSTRACT

The invention relates to a method for synchronizing the internal clock of a mobile radio terminal with the local time, which is characterized in that the mobile radio terminal transmits a short message (SM) to itself, the local time may be deduced from the transmission and received times for the short message signal and the time stamp within the received short message and the internal clock is synchronized with the said local time.

4 Claims, 2 Drawing Sheets

METHOD FOR SYNCHRONIZING THE INTERNAL CLOCK OF A MOBILE RADIO TERMINAL WITH LOCAL TIME

BACKGROUND OF THE INVENTION

1. Field of the Invention

The invention relates to a method for the synchronization of the internal clock of a mobile radio terminal device with the local time.

2. Description of the Prior Art

It is known that a mobile radio terminal device, in particular a GSM terminal device, does not have the capability of determining the correct local time of day. Even if a clock module is installed in the terminal device, it is, in general, necessary for the user to provide it with the correct time.

The invention addresses the problem of proposing a simple and automated method for the synchronization of the internal clock of a mobile radio terminal device with the local time.

SUMMARY OF THE INVENTION

This problem is solved in the invention as herein disclosed and claimed.

The described method offers the mobile radio subscriber the capability of having displayed the current local time of day by the mobile radio terminal device in simple manner. The time of day can be determined accurately to a few seconds, which, for practical purposes, is entirely sufficient.

The method can be expanded such that a mobile radio subscriber can be provided with the "correct" local time even when traveling, i.e. when roaming, virtually by the "push of a button".

BRIEF DESCRIPTION OF THE DRAWINGS

In conjunction with FIGS. 1 and 2 an example of the method according to the invention will be explained. Based on the Figures and their description, additional characteristics and advantages of the invention will become evident. The drawings depict.

Figure 1:
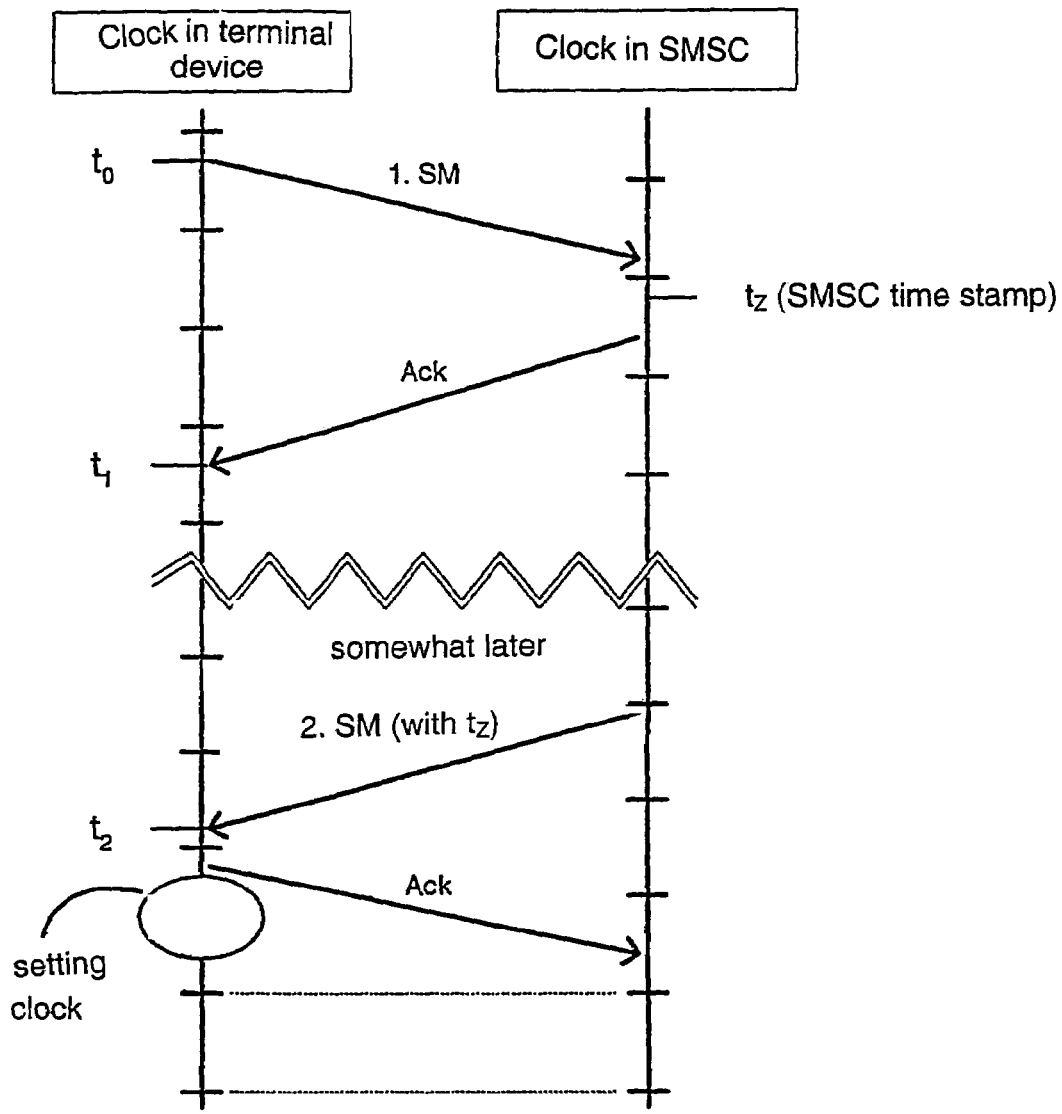
FIG. 1 by way of example a flow chart of the method for setting the clock in the terminal device by means of a short message to itself, FIG. 2 flow chart for improving the accuracy of the method.

As is evident in FIG. 1, the method according to the invention essentially utilizes the fact that in digital mobile radio networks, in particular GSM mobile radio networks, each short message is conducted via a so-called Short Message Service Center (SMSC), and here each message is provided with a time stamp $t_Z$ which, in turn, is indicated to the receiver of the message.

Thus, if a mobile radio terminal device sends a short message to itself at time $t_0$, it is informed at time $t_2$ (after a few seconds) of the time $t_Z$ of the arrival of its own message in the SMSC when receiving the short message sent to itself. If the terminal device remembers the sending time $t_0$ by registering the setting of the internal clock, as well as the acknowledge time $t_1$, a few seconds after sending its own message, then thereby a time window between $t_0$ and $t_1$ is given, in which the time stamp $t_Z$ of the SMSC must assuredly lie. Through maximal boundary definition of the time window, the time $t_Z$ can be derived with good accuracy.

DETAILED DESCRIPTION OF THE PREFERRED EMBODIMENTS

Figure 2:
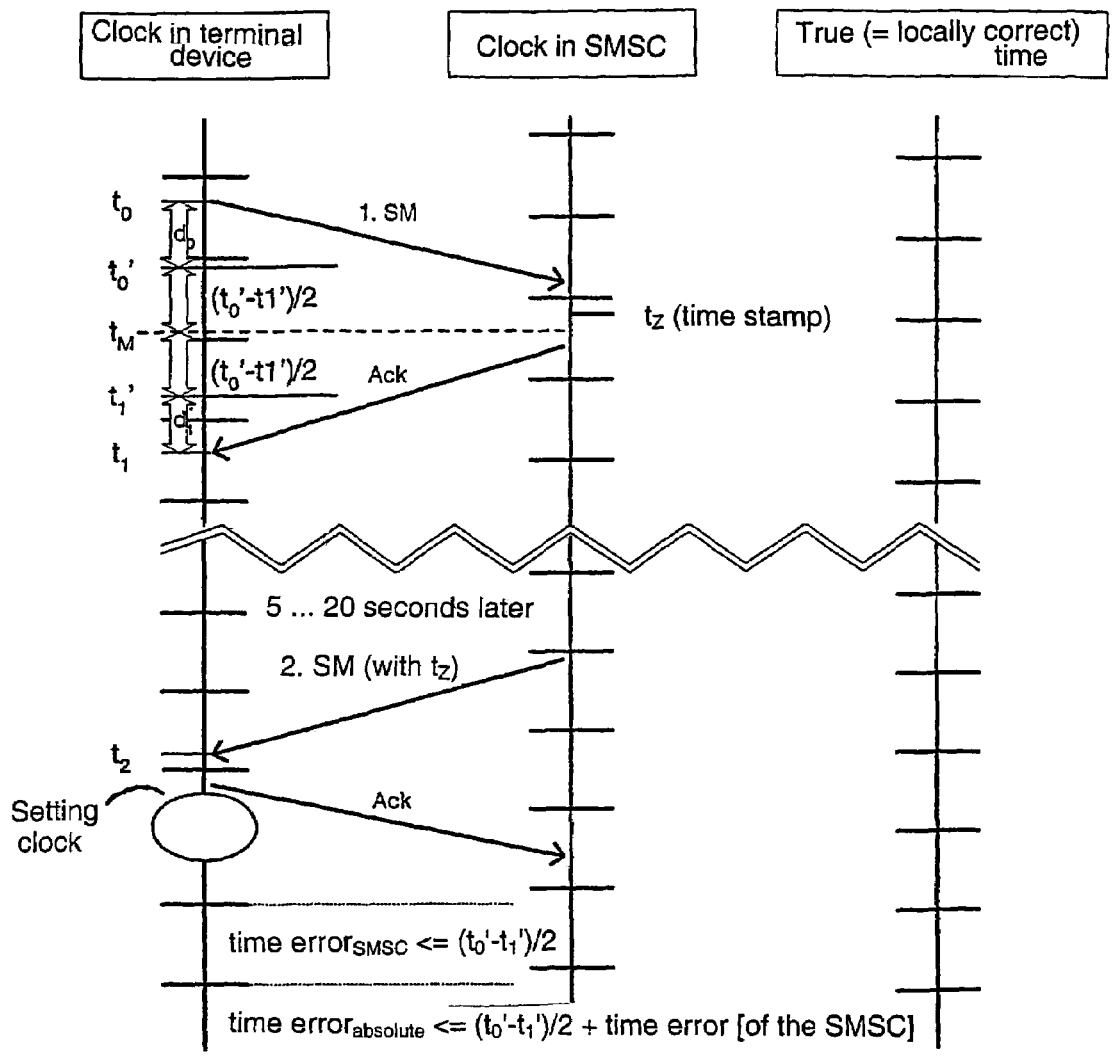

A detailed consideration of the minimum transmission times in the GSM network, in particular the delay time of the signals at the air interface, permits a further shrinking of the time window between $t_0$ and $t_1$, such that an accuracy of the prediction of $t_Z$ of approximately one second appears attainable. This accuracy is often sufficient for practical purposes. This will be explained in the following in conjunction with FIG. 2.

At time $t_0$ the terminal device sends a short message to itself, which is received by the SMSC.

The terminal device calculates the time $t_0'=t_0+d_0$ wherein $d_0$ is the estimated or known minimum transmission time for the message from the terminal device to the SMSC. The message cannot have arrived at the SMSC before the passage of $d_0$ time units.

The terminal device waits for the acknowledgment (Ack) of the reception of the message in the SMSC. The acknowledgment arrives at time $t_1$.

The terminal device calculates the time $t_1'=t_1-d_1$, wherein $d_1$ is the estimated or known minimum transmission time for the acknowledgment from the SMSC to the terminal device. The SMSC must have gotten the acknowledge on its way before this time $t_1'$.

Now, the mean value $t_M=(t_1'+t_0')/2$ is formed from the calculated times $t_0'$ and $t_1'$. This mean value $t_M$ corresponds fairly accurately to the value (point in time) of the time stamp $t_Z$ assigned by the SMSC.

The terminal device now waits for the arrival of the message directed to itself, which arrives at time $t_2$.

The terminal device takes the time stamp $t_Z$ from the message.

The terminal device compares the time stamp $t_Z$ with the calculated value $t_M$ and, if necessary, corrects its internal clock by the difference of $t_D=t_Z-t_M$ time units. It is obvious that with this selection of correction the maximum time error relative to the SMSC is $t=(t_1-t_0)/2$ or the least.

The absolute accuracy depends on the maximum discrepancy of the SMSC clock from the "true time", i.e. the absolute time error is greater by the inaccuracy of the time base in the SMSC.

The method can also be applied in the case of roaming, i.e. if a mobile radio subscriber is located outside of his home network, if the SMS message is transmitted to a time server connected to the SMSC, and the time server is informed in the message of the network code of that network into which the terminal device is currently logged in. The time server provides in his response to the terminal device information about the time zone or the correction to be applied. Herein the home SMSC can continue to be employed. This can be realized relatively readily in the terminal device, for example through an SIM toolkit application.

What is claimed:

1. Method for the synchronization of the internal clock of a mobile radio terminal device with the local time, wherein the mobile radio terminal device sends a short message (SM) to itself and from the sending and receiving times of the short message signals and a time stamp $t_z$ comprised in the received short message derives the local time of day and synchronizes the internal clock with this local time of day, and wherein the mobile radio terminal device registers the sending time $t_0$ of the short message as well as the time of acknowledge $t_1$ of the short message and derives therefrom the time $t_M=(t_1+t_0)/2$, wherein $t_M$ corresponds approximately to the point in time of the time stamp $t_z$.

2. Method as claimed in claim 1, wherein the mobile radio terminal device extracts from the received short message the time stamp $t_z$, compares it with $t_M$, and corrects the internal clock by the difference $t_D=(t_z-t_M)$.

3. Method as claimed in claim 1, wherein an improvement of the accuracy of $t_M$ is attained by taking into consideration the delay times $d_0$ and $d_1$, with $t_M=(t_1'+t_0')/2$, wherein $t_1'=t_1-d_1$ and $t_0'=t_0-d_0$.

4. Method as claimed in claim 1, wherein the SMSC is informed in the short message of the network code of that network into which the terminal device is currently logged in, which network code is transferred to a time server connected to the SMSC and the time server transmits to the terminal device in its response the time zone or the correction to be applied.

* * * * *